United States Patent
Cigolini

[11] Patent Number: 4,638,685
[45] Date of Patent: Jan. 27, 1987

[54] ORTHOPAEDIC SAFETY STRAP SUITABLE FOR BICYCLE PEDALS

[76] Inventor: Flavio Cigolini, Via Martinengo 22506 Sant'Andrea di Concesio, Brescia, Italy

[21] Appl. No.: 681,128

[22] Filed: Dec. 13, 1984

[30] Foreign Application Priority Data

Dec. 14, 1983 [IT] Italy .................................. 5235 A/83
Mar. 23, 1984 [IT] Italy .................................. 5133 A/84

[51] Int. Cl.$^4$ ............................................. G05G 1/14
[52] U.S. Cl. ................................. 74/594.6; 74/594.4; 280/289 R; 280/294
[58] Field of Search ................ 74/594.1, 594.4, 594.5, 74/594.6; 280/289 R, 291, 294

[56] References Cited

U.S. PATENT DOCUMENTS

| | | | |
|---|---|---|---|
| 4,172,392 | 10/1979 | Foster | 74/594.6 |
| 4,200,005 | 4/1980 | Mohr | 74/594.4 |
| 4,327,602 | 5/1982 | Le Bec | 74/594.6 |
| 4,386,472 | 6/1983 | Shimano | 74/594.6 |

FOREIGN PATENT DOCUMENTS

| | | | |
|---|---|---|---|
| 2407121 | 4/1979 | France | 74/594.6 |
| 2507561 | 12/1982 | France | 74/594.6 |
| 1106200 | 3/1961 | Italy | 74/594.6 |

*Primary Examiner*—George L. Walton
*Attorney, Agent, or Firm*—Oblon, Fisher, Spivak, McClelland & Maier

[57] ABSTRACT

An orthopaedic safety strap suitable to keep a cyclist's feet tied to their respective bicycle pedals. The strap is orthopaedic due to the fact that it is composed of flexible strips 3 and 6, that respectively have the broadenings 3' and 6' that cover the sides of the foot. It is safe because the flexible strips 3 and 6 join together, first between themselves very firmly, and then to a metallic buckle 8 that unbuckles with a movement of the cyclist's feet.

4 Claims, 5 Drawing Figures

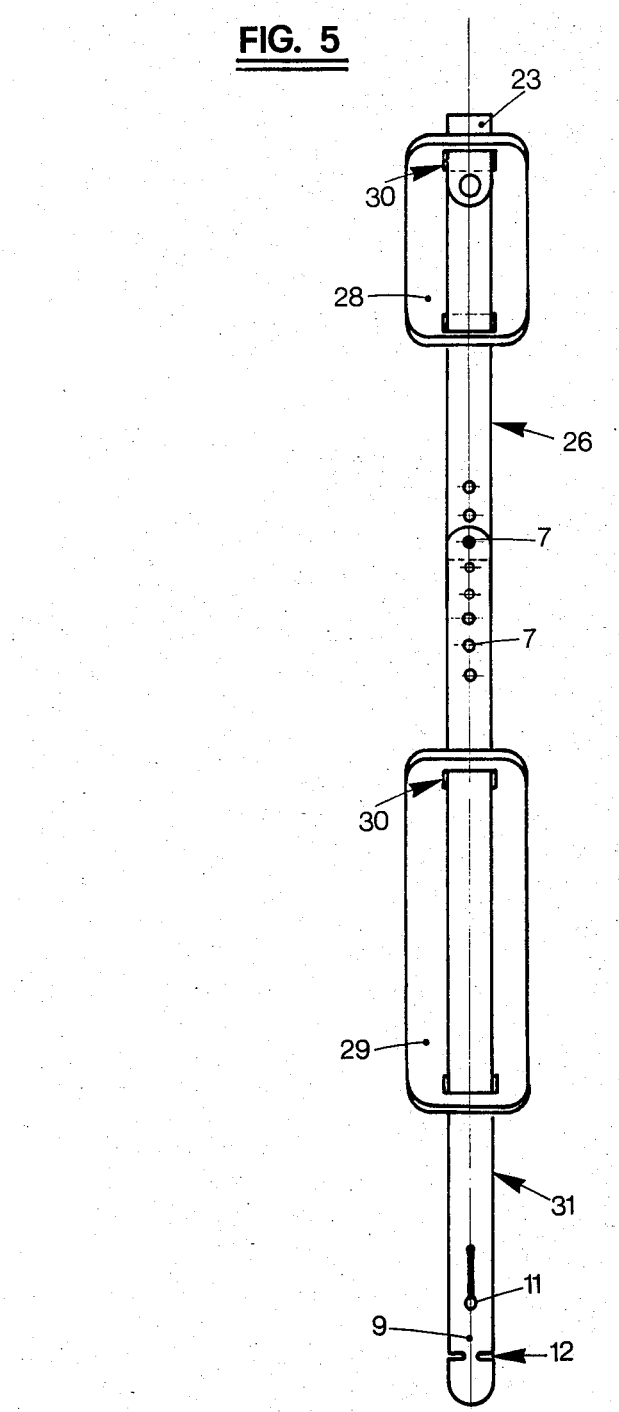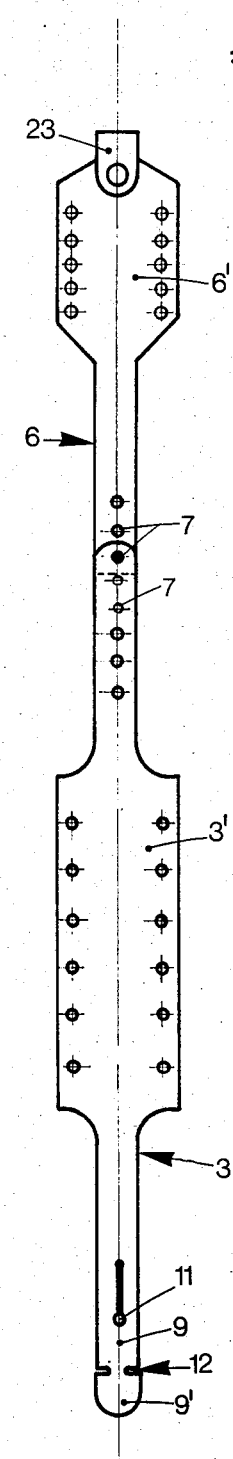

ORTHOPAEDIC SAFETY STRAP SUITABLE FOR BICYCLE PEDALS

BACKGROUND OF THE INVENTION

Cyclists keep their feet tied to the bicycle pedals with straps made of leather strips equipped with buckles. The straps are pulled tighter during the more difficult moments of fatigue. This joining of the feet to the pedals of the bicycle, required to guarantee more strength in pedalling, creates a discomfort to the cyclist because all the strips that are customarily used are narrow, strong leather tapes that, due to their size, are adaptable to all types of pedals, all buckles, and all toe pieces on the market. Because of this, the straps are bothersome and painful. Such straps are also dangerous when the cyclist falls or is involved in falls that he cannot, of course, forsee and must suffer without being able to prevent or moderate the consequences.

OBJECT OF THE INVENTION

It is the object of this invention to give an orthopaedic and safe means to the cyclist for strapping his feet to his bicycle pedals.

SUMMARY OF THE INVENTION

The present invention gives cyclists a suitable means to avoid the dangers and discomforts described above. The straps according to the invention are made up from strips similar to those that are now on sale. The straps are made up from flexible strips having a particular shape and with a buckle to which is joined a new element equipped with an automatic button or other means of coupling. With both pedals of a bicycle fitted out with such new straps, the cyclist finds, his feet fastened by means of devices that do not cause pain or annoyance and offer the advantage of being able to free his feet from the pedals, when he realizes the necessity, without taking his hands off the handle bar. The cyclist accomplishes this result by carrying out one sole energetic movement consisting in kicking both feet in an outward direction, each foot against its own buckle. Another advantage that comes from the use of such straps is that the cyclist, after the releasing manoeuvre, is not left without support, but always feels the pedals joined to his feet and therefore is in a condition to be able to quickly abandon his bicycle. The releasing manoeuvre is always safe because, at the end of the tape that comes out of the buckle, there is a knot that keeps the tape bound to the same buckle. The cyclist himself adapts the knot beforehand and uses it also for the fastening manoeuvre. To better illustrate the characteristics of the invention, here below is described its presently preferred embodiment, given as a non-binding and non-limitative example.

FIG. 4 is a drawing of the two shaped tapes that make up the orthopaedic strap.

FIG. 5 is a drawing of a second embodiment of the flexible parts of the orthopaedic strap. In this embodiment, the orthopaedic strap is made up from four elements.

DETAILED DESCRIPTION OF THE PRESENTLY PREFERRED EMBODIMENT

Figure 1:
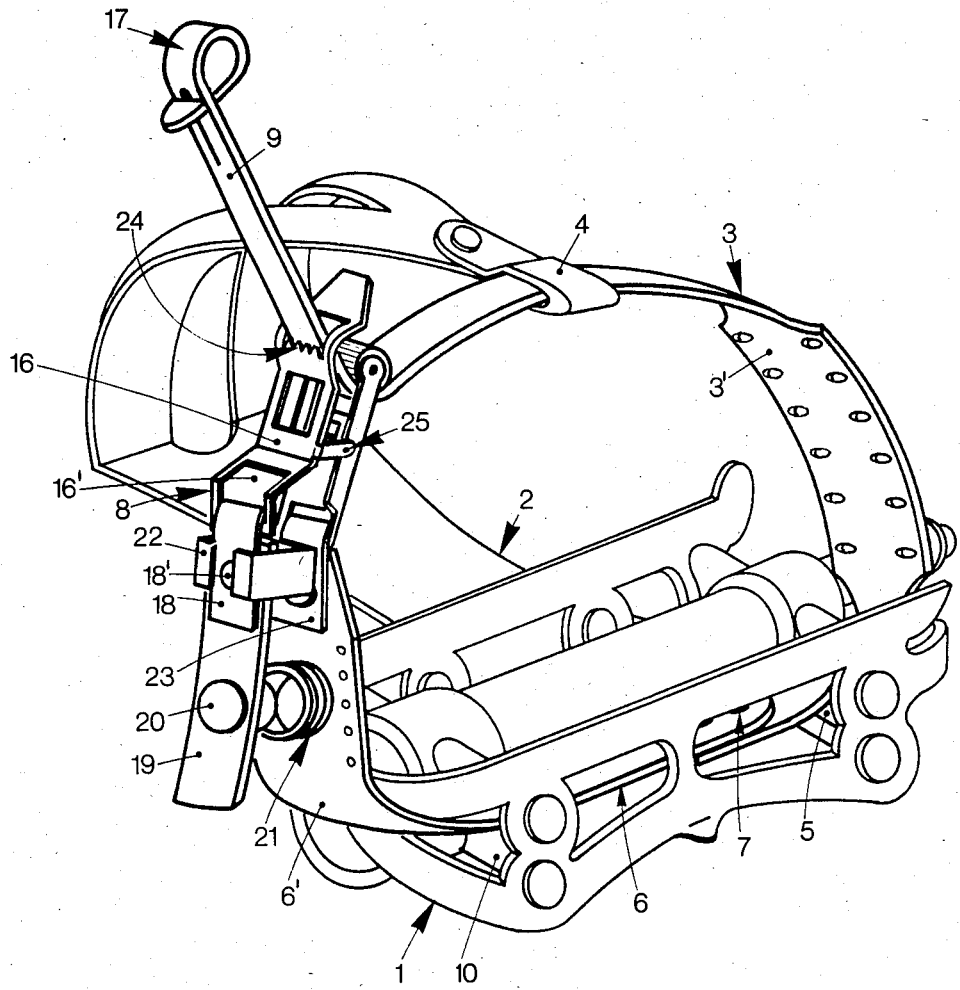
FIG. 1 is a perspective view of a strap joined to the left pedal of a racing bicycle and in the condition to tighten on a foot, not illustrated for obvious reasons.

The first three figures show all the elements that make up the invention joined to a left pedal 1. A metallic toe-piece 2 is mounted on the pedal 1. Tapes 3 and 6, each of which is made from a flexible material, are fitted the pedal 1 to fasten the inside and outside back of the foot. The tapes 3 and 6 pass through a slot 4 in the toe-piece 2 and through slits 5 and 10 in the pedal 1. The tapes 3 and 6 are joined together by snaps 7 that permit the strap to be adjusted to the size of the cyclist's foot. The tapes 3 and 6 (as indicated in FIGS. 1, 4, and 5) each have a broadened part 3' and 6'. The broadened parts 3' and 6' are provided to involve a greater surface of the cyclist's foot where his foot is subjected to major strains.

When the tapes 3 and 6 are inserted into the slits 5 and 10 and are joined with the snap 7, the part of the strap that remains open is fastened together with a metallic buckle 8 of a type that is known per se and is used to quickly join or separate the feet from the pedals.

The strap in question becomes safe through some elements that make it manoeuvarable by using the foot. A balancing element 19 is joined to a swinging element 16 by a metallic clip 18 and a snap 18'. An element 21 of an automatic button is joined to the tape 6 where the broadened part 6' is situated. An element 20 of the automatic button is joined to the free end of the balancing element 19. A ring or U-bolt 22 is joined to a metallic clip 23 that holds the balancing element 19 when it is unfastened.

In the prior art straps in order to unfasten the strap, the cyclist must let go of the handle bar with one hand to press the swinging element 16 of the buckle 8 with his finger, where a slot 16' is positioned. This action releases detents 24 that are pushed by a spring against a roller 14 so as to hold the detents of 24 against the end 9 of the tape 3 that passes through slots 13 and 15. In contrast, the strap according to the invention serves to eliminate the above mentioned manual manoeuvre by the cyclist and guarantees the releasing of the buckle 8 through the sole movement of the foot tied to the pedal. This is possible when the elements 20 and 21 of the automatic button are fastened and keep the balancing element 19 and the tape 6 joined together. This transforms the balancing element 19 into a tie-rod.

In the new strap, however, the buckle 8, besides being the necessary device for the fastening of the tapes 3 and 6, becomes the safety organ by which the cyclist automatically and immediately frees himself from the bonds that keep him tied to the bicycle.

When the cyclist wants to do it or by instinct, he acts with both feet against the broadened parts 6', and the metallic clips 23 of the buckles 8 cause the removing of the detents 24 from the rollers 24 that allow the tapes 3 to slide and free the feet. FIG. 1 shows how the elements that form the strap behave when the elements 20 and 21 of the automatic button are fastened and the tapes 3 and 6 firmly tie the foot to the pedal 1.

Figure 2:
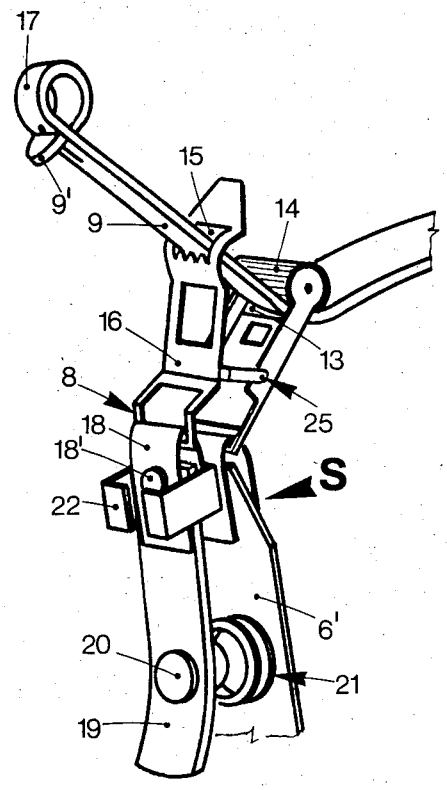
FIG. 2 is a drawing of the strap with the buckle slackened. The arrow S shows the position where the kicking movement is carried out to release the fastener system.

FIG. 2 shows the elements 20 and 21 when they are fastened, and the arrow S shows the point where the kicking of the swinging the feet causes the movement of element 16, since it primarily releases itself when the balancing element 19 pulls the swinging element 16.

This movement allows the end 9 to slide in the slot 15 up to a knot 17 at the end 9 of the tape 3.

Figure 3:
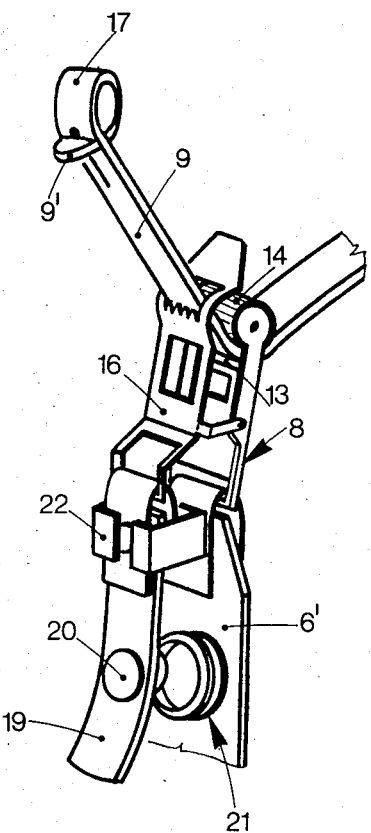
FIG. 3 is a drawing of the strap of FIG. 2 where the automatic button is undone.

FIG. 3 shows the new strap whilst carrying out the normal functions of a strap without safety, that to be manoeuvred needs the manual push of the cyclist. In this case, the ring or U-bolt 22 is joined to the metallic clip 23 through a snap (not shown) that joins also a clip 23' (shown in FIG. 1) to the broadened part 6', retaining the balancing element 19, unfastened, so as not to flap, causing disturbances. The tapes 3 and 6, equipped with the broadened parts 3' and 6', are indicated in FIG. 4 to show their characteristics, whilst in FIG. 5 strips 26 and 31 are indicated equipped with orthopaedic broadenings 28 and 29 joined to the strips 26 and 31 by means of slots 30.

In the end 9 of the tape 3 are two recesses 12 functioning as stops for the projecting part 9' in a slot 11 (shown in FIGS. 4 and 5). The recesses 12 and the slot 11 are used to form the knot 17 that the cyclist gets hold of with safety for tightening. Because of the knot 17, the end 9 of the tape 3 not come out of slots 15 and 13.

What is claimed is:

1. An orthopaedic safety strap which, in use, is passed through slits in a bicycle pedal and over the cyclist's foot to bind the cyclist's foot on the pedal and in a toe-piece, said orthopaedic safety strap comprising:
    (a) a first elongated tape comprising:
        (i) a first portion sized and shaped to pass through the slits in a bicycle pedal;
        (ii) a second portion connected to said first portion, said second portion being substantially broader than said first portion and being sized and shaped to provide orthopaedic lateral support to the cyclist's foot;
        (iii) a third portion connected to said second portion, said third portion being substantially narrower than said second portion and being sized and shaped to be received in and held by a buckle (to be recited); and
        (iv) a plurality of first snaps mounted on said first portion;
    (b) a second elongated tape comprising:
        (i) a first portion sized and shaped to pass through the slits in the bicycle pedal;
        (ii) a second portion connected to said first portion, said second portion being substantially broader than said first portion and being sized and shaped to provide orthopaedic lateral support to the cyclist's foot;
        (iii) a plurality of second snaps mounted on said first portion, said plurality of second snaps being sized, shaped, and positioned so that a selected one of said first snaps can be engaged with a selected one of said second snaps, permitting the size of the orthopaedic safety strap to be adjusted to the size of the cyclist's foot;
    (c) a clip attached to the end of said second elongated tape remote from said first portion of said second elongated tape;
    (d) a buckle attached to said clip, said buckle comprising:
        (i) a roller about which said third portion of said first elongated tape is passed during use of the orthopaedic safety strap;
        (ii) a swinging element that is pivotally mounted on said clip for movement between a first position and a second position, said swinging element containing a throughhole lined with detents, said swinging element, said throughhole, and said detents being sized, shaped, and positioned so that, when said swinging element is in its first position and said third portion of said first elongated tape is passed around said roller and through said throughhole, said detents engage said third portion of said first elongated tape and bind the cyclist's foot on the pedal and so that, when said swinging element is in its second position, said detents release said third portion of said first elongated tape; and
        (iii) a balancing element connected to said swinging element such that movement of said balancing element from a first position to a second position causes said swinging element to move from its first position to its second position; and
    (e) a button for the automatic release of the orthopaedic safety strap, said button comprising a first element mounted on said second portion of said second elongated tape, a second element mounted on said balancing element in position to releasably engage said first element, and a spring resiliently biasing said balancing element away from said second portion of said second elongated tape, said first and second elements being designed to release engagement in response to lateral movement of the cyclist's foot against said first element,
    whereby, when the cyclist moves his foot laterally against said second portion of said second elongated tape, said first and second elements of said button disconnect, said spring forces said balancing element from its first position to its second position, the movement of said balancing element from its first position to its second position moves said swinging element from its first position to its second position, said detents release said third portion of said first elongated tape, and the bicyclist can quickly and safely remove his foot from the toe-piece.

2. An orthopaedic safety strap as recited in claim 1 wherein:
    (a) said second portion of said first elongated tape is integral with said first and third portions of said first elongated tape and
    (b) said second portion of said second elongated tape is integral with said first portion of said second elongated tape.

3. An orthopaedic safety strap as recited in claim 1 wherein:
    (a) said second portion of said first elongated tape is slidably mounted on said first and third portions of said first elongated tape and
    (b) said second portion of said elongated tape is slidably mounted on said first portion of said second elongated tape.

4. An orthopaedic safety strap as recited in claim 1 wherein said third portion of said first elongated tape contains a throughslit and at least one edge slit which cooperates with said throughslit to permit said third portion of said first elongated tape to be doubled back on itself to form a knot which will not slide through said buckle when third portion of said first elongated tape is released by said detents, whereby the orthopaedic safety strap is loosened but does not separate when the cyclist actuates said button.

* * * * *